United States Patent
Fox et al.

(10) Patent No.: US 11,763,089 B2
(45) Date of Patent: Sep. 19, 2023

(54) INDICATING SENTIMENT OF USERS PARTICIPATING IN A CHAT SESSION

(71) Applicant: INTERNATIONAL BUSINESS MACHINES CORPORATION, Armonk, NY (US)

(72) Inventors: Jeremy R. Fox, Georgetown, TX (US); Jonathan Dunne, Dungarvan (IE); Jana H. Jenkins, Raleigh, NC (US); Trudy L. Hewitt, Cary, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 686 days.

(21) Appl. No.: 16/219,130

(22) Filed: Dec. 13, 2018

(65) Prior Publication Data

US 2020/0192981 A1    Jun. 18, 2020

(51) Int. Cl.
G06F 40/289 (2020.01)
G06F 40/30 (2020.01)
H04L 51/04 (2022.01)
H04L 67/50 (2022.01)

(52) U.S. Cl.
CPC .............. G06F 40/30 (2020.01); H04L 51/04 (2013.01); H04L 67/535 (2022.05)

(58) Field of Classification Search
None
See application file for complete search history.

(56) References Cited

U.S. PATENT DOCUMENTS

| | | | |
|---|---|---|---|
| 10,037,318 B2* | 7/2018 | Liu | G06F 21/10 |
| 2009/0128567 A1* | 5/2009 | Shuster | G06T 13/40 |
| | | | 345/473 |
| 2011/0296324 A1* | 12/2011 | Goossens | G06F 3/04845 |
| | | | 715/763 |
| 2012/0327183 A1* | 12/2012 | Fujii | H04N 7/157 |
| | | | 348/E7.083 |

(Continued)

FOREIGN PATENT DOCUMENTS

WO    2015102125 A1    7/2015

OTHER PUBLICATIONS

Alam et al., "A text-based chat system embodied with an expressive agent." Advances in Human-Computer Interaction 2017 (Year: 2017).*

(Continued)

*Primary Examiner* — Seong-Ah A Shin
(74) *Attorney, Agent, or Firm* — CUENOT, FORSYTHE & KIM, L.L.C.

(57) ABSTRACT

A sentiment analysis of a chat session in which a plurality of chat messages are posted is performed. Based on the sentiment analysis, at least one emotive model is derived for the chat session. A sentiment of users in the chat session can be determined using the emotive model. A user composing a new chat message for the chat session can be monitored. Based on the monitoring, an impact on the sentiment of the users in the chat session by the new chat message can be determined. A client device can be initiated to display the impact on the sentiment of the users in the chat session by the new chat message before the new chat message is posted in the chat session.

20 Claims, 4 Drawing Sheets

(56) References Cited

U.S. PATENT DOCUMENTS

| | | | |
|---|---|---|---|
| 2013/0275352 A1* | 10/2013 | Servi | G06N 3/08 706/21 |
| 2014/0244264 A1* | 8/2014 | Thirumalainambi | G10L 25/63 704/270 |
| 2015/0036883 A1* | 2/2015 | Deri | G06V 20/52 382/103 |
| 2015/0058416 A1* | 2/2015 | Felt | G06Q 50/01 709/204 |
| 2016/0147731 A1 | 5/2016 | Parikh et al. | |
| 2016/0241500 A1* | 8/2016 | Bostick | H04L 51/10 |
| 2017/0132207 A1 | 5/2017 | Goldstein et al. | |
| 2017/0180276 A1 | 6/2017 | Gershony et al. | |
| 2017/0185581 A1* | 6/2017 | Bojja | G06V 30/19173 |
| 2017/0302709 A1* | 10/2017 | Jones | G06F 3/04817 |
| 2018/0150739 A1* | 5/2018 | Wu | G06N 3/006 |
| 2018/0196796 A1* | 7/2018 | Wu | G06F 40/289 |
| 2018/0336715 A1* | 11/2018 | Rickwald | G06T 13/40 |
| 2018/0357286 A1* | 12/2018 | Wang | G06F 16/3329 |

OTHER PUBLICATIONS

Ma et al., "A Chat System Based on Emotion Estimation from Text and Embodied Conversational Messengers", Proceedings of the 2005 International Conference on Active Media Technology, 2005. (AMT 2005), IEEE, 2005 (Year: 2005).*

Shan et al., "Learning polynomial function based neutral-emotion GMM transformation for emotional speaker recognition." 2008 19th International Conference on Pattern Recognition. IEEE, 2008. (Year: 2008).*

"Latent Dirichlet allocation," [online] Wikipedia, the Free Encyclopedia, last updated Oct. 9, 2018, retrieved from the Internet: <https://en.wikipedia.org/wiki/Latent_Dirichlet_allocation>, 12 pg.

"Sentiment Analysis," [online] Wikipedia, the Free Encyclopedia, last updated Oct. 9, 2018, retrieved from the Internet: <https://en.wikipedia.org/wiki/Sentiment_analysis>, 11 pg.

"AlchemyLanguage," [online] IBM Watson Developer Cloud [retrieved Dec. 13, 2018], retrieved from the Internet: <https://www.ibm.com/watson/developercloud/alchemy-language.html>, 3 pg.

Šuvakov M. et al., "Collective emotion dynamics in chats with agents, moderators and Bots," [online] Condensed Matter Physics, vol. 17, No. 3, Apr. 19, 2014, retrieved from the Internet: <http://www.icmp.lviv.ua/journal/zbirnyk.79/33801/art33801.pdf>, 12 pg.

"Watson Natural Language Understanding," [online] IBM Corporation [retrieved Feb. 16, 2019], retrieved from the Internet: <https://www.ibm.com/watson/services/natural-language-understanding/>, 7 pg.

* cited by examiner

INDICATING SENTIMENT OF USERS PARTICIPATING IN A CHAT SESSION

BACKGROUND

The present invention relates to data processing systems, and more specifically, to data processing systems used for real time communication.

In today's electronic world, people oftentimes communicate using text-based messaging. Text-based messaging is a form of real time communication between two or more users in which the users compose text-based electronic messages, typically consisting of alphabetic and/or numeric characters, and communicate the composed messages to one or more other users. The use of text-based messaging has grown over the past decade due to its convenience. For example, rather than participating in an online telephonic or video conference, users can participate in a chat session to communicate with other users. This allows users greater flexibility to multitask while still communicating with the other users.

SUMMARY

A method includes performing a sentiment analysis of a chat session in which a plurality of chat messages are posted. The method also can include, based on the sentiment analysis, deriving, using a processor, at least one emotive model for the chat session. The method also can include determining, using the emotive model, a sentiment of users in the chat session. The method also can include monitoring a first of the users composing a new chat message for the chat session. The method also can include, based on the monitoring the first user composing the new chat message for the chat session, determining an impact on the sentiment of the users in the chat session by the new chat message. The method also can include initiating a client device to display the impact on the sentiment of the users in the chat session by the new chat message before the new message is posted in the chat session.

A system includes a processor programmed to initiate executable operations. The executable operations include performing a sentiment analysis of a chat session in which a plurality of chat messages are posted. The executable operations also can include, based on the sentiment analysis, deriving at least one emotive model for the chat session. The executable operations also can include determining, using the emotive model, a sentiment of users in the chat session. The executable operations also can include monitoring a first of the users composing a new chat message for the chat session. The executable operations also can include, based on the monitoring the first user composing the new chat message for the chat session, determining an impact on the sentiment of the users in the chat session by the new chat message. The executable operations also can include initiating a client device to display the impact on the sentiment of the users in the chat session by the new chat message before the new message is posted in the chat session.

A computer program product includes a computer readable storage medium having program code stored thereon. The program code is executable by a data processing system to initiate operations. The operations include performing a sentiment analysis of a chat session in which a plurality of chat messages are posted. The operations also can include, based on the sentiment analysis, deriving at least one emotive model for the chat session. The operations also can include determining, using the emotive model, a sentiment of users in the chat session. The operations also can include monitoring a first of the users composing a new chat message for the chat session. The operations also can include, based on the monitoring the first user composing the new chat message for the chat session, determining an impact on the sentiment of the users in the chat session by the new chat message. The operations also can include initiating a client device to display the impact on the sentiment of the users in the chat session by the new chat message before the new message is posted in the chat session.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
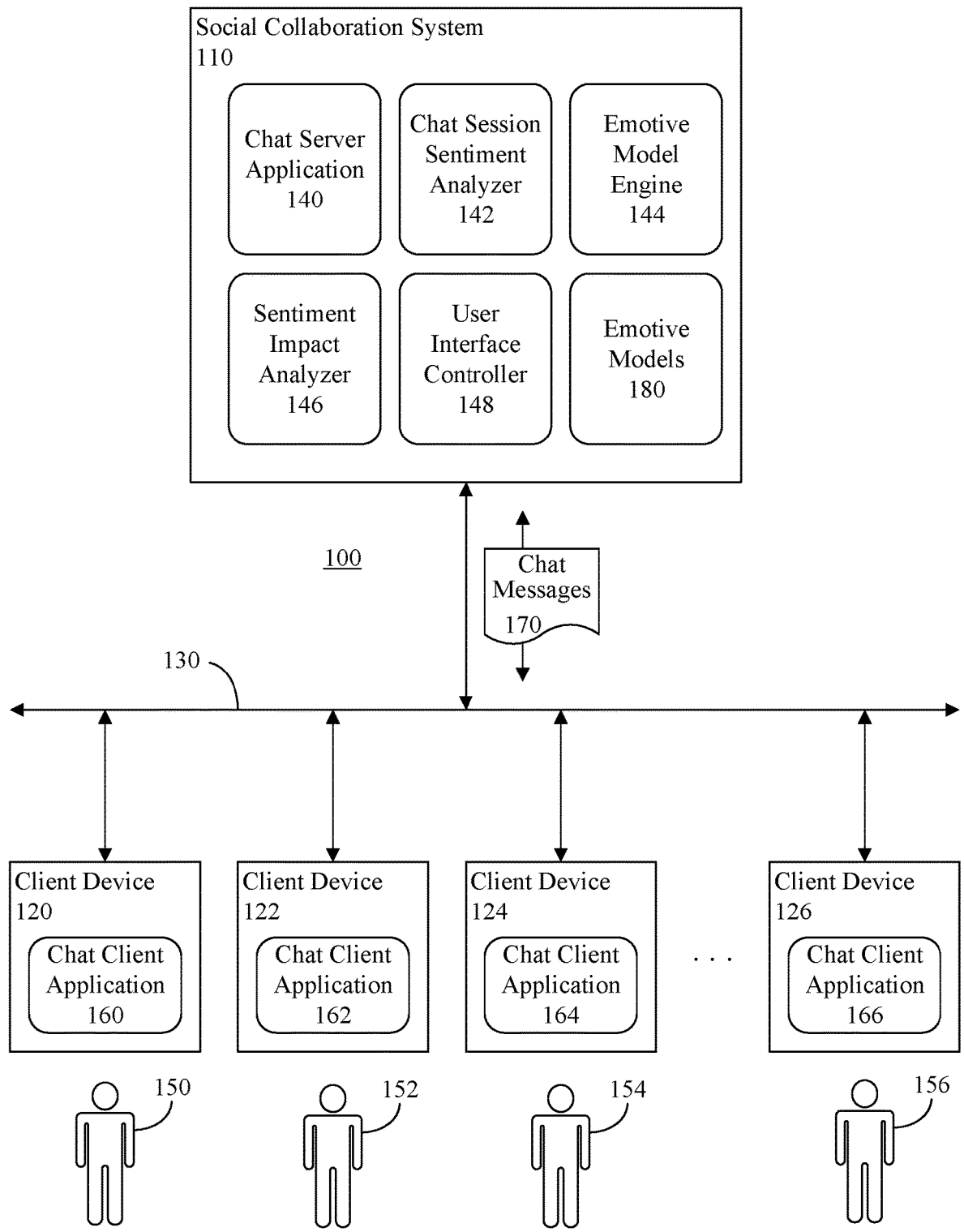
FIG. 1 is a block diagram illustrating an example of a social collaboration computing environment.

This disclosure relates to data processing systems, and more specifically, to data processing systems used for real time communication. In accordance with the inventive arrangements disclosed herein, an emotive analysis can be conducted on chat messages posted in a chat session. Emotive models can be derived based on the emotive analysis. Using at least one emotive model, an emotive impact of a new chat message can be determined prior to the chat message being posted in the chat session. Information pertaining to the emotive impact can be presented to the user who is composing the chat message. Accordingly, the user can review the information and revise the chat message before posting the chat message. Further, the emotive models can be used to determine various other sentiments expressed in the chat session, and the various sentiments can be indicated to the users via user interfaces being used by the users to participate in the chat session.

Several definitions that apply throughout this document now will be presented.

As defined herein, the term "social collaboration system" means a data processing system that hosts at least one social collaboration application.

As defined herein, the term "text-based messaging" means a real time communication of text between two or more users over at least one communication network, wherein the users enter the text into a message using a keyboard, a virtual keyboard (e.g., an on-screen keyboard), a keypad and/or by providing spoken utterances that are converted to text using speech recognition.

As defined herein, the term "message" means an electronic message comprising text that is communized using text-based messaging.

As defined herein, the term "chat session" means a form of text-based electronic messaging in which a plurality of users compose messages on client devices, and the messages are posted to a social collaboration system in a thread for sharing with other users participating in and/or subscribing to the thread. Users view messages in the social collaboration system, for example by accessing the social collaboration system using client devices.

As defined herein, the term "chat message" means a message composed for posting in a chat session.

As defined herein, the term "emotive model" means a data structure configured to determine a sentiment of users toward chat messages posted in a chat session.

As defined herein, the term "quintic emotive model" means an emotive model derived using a quintic function.

As defined herein, the term "quintic function" means a function in the following form:

$$g(x) = ax^5 + bx^4 + cx^3 + dx^2 + ex + f$$

where a, b, c, d, e and f are members of a field, typically the rational numbers, the real numbers or the complex numbers, and a is nonzero.

As defined herein, the term "emotive score" means at least one value indicating a predicted impact of a chat message on sentiment of users participating in a chat session.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

FIG. 1 is a block diagram illustrating an example of a social collaboration computing environment (hereinafter "computing environment") 100. The computing environment 100 can include a social collaboration system 110 and a plurality of client devices 120, 122, 124, 126 communicatively linked to the social collaboration system 110 via at least one communication network 130. The communication network 130 is the medium used to provide communications links between various devices and data processing systems connected together within the computing environment 100. The communication network 130 may include connections, such as wire, wireless communication links, or fiber optic cables. The communication network 130 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or similar technologies.

The social collaboration system 110 can be a data processing system that hosts at least one chat server application 140. The social collaboration system also can a chat session sentiment analyzer 142, an emotive model engine 144, a sentiment impact analyzer 146 and a user interface controller 148. In an arrangement, the chat session sentiment analyzer 142, emotive model engine 144, sentiment impact analyzer 146 and user interface controller 148 can be components of the chat server application 140. In another arrangement, one or more of the chat session sentiment analyzer 142, emotive model engine 144, sentiment impact analyzer 146 and user interface controller 148 can be separate components that are communicatively linked to the chat server application 140. Moreover, one or more of the components 142-148 may execute on another data processing system that is communicatively linked to the social collaboration system 110.

The chat server application 140 can host chat sessions in which users 150, 152, 154, 156 of the client devices 120-126 participate, for example using chat client applications 160, 162, 164, 166 communicatively linked to the chat server application 140. Via the chat client applications 160-166, the users 150-156 can post chat messages in one or more chat sessions and view chat messages posted in one or more chat sessions. In another arrangement, one or more of the users can participate in one or more chat sessions using web browsers executing on the respective client devices 120-126 to post and view chat messages. The chat server application 140 can store each chat message 170 in a particular format. In illustration, the chat server application 140 can store each chat message 170 as a JavaScript Object Notation (JSON) file, and create an association between each JSON file and the chat session, for example by assigning a chat session identifier to the chat session and including that chat session identifier in each JSON file.

The chat session sentiment analyzer 142 can, in real time as chat messages 170 are posted in the chat session, analyze sentiments expressed and/or implied by the chat messages 170. In illustration, the chat session sentiment analyzer can implement sentiment analysis to analyze each chat message 170 posted in the chat session and assign one or more sentiment scores to each chat message 170. For example, the chat session sentiment analyzer 142 can specify a plurality of sentiments (e.g., anger, fear, disgust, satisfaction, joy, etc.). For each chat message 170, the chat session sentiment analyzer 142 can assign a score to each of the plurality of specified sentiments. Each score can be a value between 0 and 1, wherein a score of 0 for a sentiment indicates that sentiment is not expressed in a chat message 170 and a score of 1 indicates that the sentiment is fully expressed by a chat message 170 (e.g., the only sentiment expressed by the chat message 170).

To implement the sentiment analysis, the chat session sentiment analyzer 142 can implement natural language processing (NLP), semantic analysis and computational linguistics on information contained in the chat messages 170, and determine sentiments based on the NLP, semantic analysis and computational linguistics. NLP is a field of computer science, artificial intelligence and linguistics which implements computer processes to facilitate interactions between computer systems and human (natural) languages. NLP enables computers to derive computer-understandable meaning from natural language input. The International Organization for Standardization (ISO) (e.g., ISO/TC37/SC4) publishes standards for NLP. Semantic analysis is the implementation of computer processes to generate computer-understandable representations of natural language expressions. Semantic analysis can be used to construct meaning representations, semantic underspecification, anaphora resolution, presupposition projection and quantifier scope resolution, which are known in the art. Semantic analysis is frequently used with NLP to derive computer-understandable meaning from natural language input. An unstructured information management architecture (UIMA), which is an industry standard for content analytics, may be used by the chat session sentiment analyzer 142 to implement NLP and semantic analysis. Computational linguistics applies statistical and/or rule-based processing to natural language that may augment semantic analysis, for example using machine learning techniques.

Based on the sentiment analysis performed by the chat session sentiment analyzer 142, the emotive model engine 144 can derive, in real time, one or more emotive models 180 for the chat session. In illustration, based on the sentiment score assigned to each chat message 170, the emotive model engine 144 can derive an emotive model 180 for each chat message 170. For example, the emotive model engine 144 can use, as input parameters for generating the emotive model 180 for a particular chat message 170, the sentiment scores assigned to each specified sentiment expressed in that chat message 170. Accordingly, the emotive model can express a level of each of the specified sentiments conveyed in that chat message 170.

Moreover, the emotive model engine 144 can derive an emotive model for the overall chat session. For example, the emotive model engine 144 can determine an average sentiment score or a weighted sum of the sentiment scores assigned to each specified sentiment from among each of the chat messages 170 in the chat session. The average sentiment score can be a value between 0 and 1. Similarly, the weighted sum of the sentiment scores can be a value between 0 and 1. Thus, the weighting assigned to each individual sentiment score can be based, at least in part, on the number of sentiment scores being summed for that particular sentiment. From the average sentiment score or weighted sum of the sentiment scores, the emotive model engine 144 can derive the emotive model 180 for the overall chat session using the average sentiment scores or a weighted sum of the sentiment scores as input parameters for generating the emotive model 180. The emotive model engine 144 can update or re-derive the overall emotive model 180 each time a new chat message 170 is posted in the chat session.

Further, in a similar manner, the emotive model engine 144 can derive an emotive model 180 for chat messages 170 posted by each particular user 150-156. In illustration, for a particular user 150, the emotive model engine 144 can determine an average sentiment score or a weighted sum of the sentiment scores assigned to each specified sentiment from among each of the chat messages 170 posted by that user 150 in the chat session, and use the average sentiment score or a weighted sum of the sentiment scores as input parameters for deriving the emotive model 180. From the input parameters, the emotive model engine 144 can derive the emotive model 180 for the chat messages 170 posted by that user 150. The emotive model engine 144 can update or re-derive the overall emotive model 180 for the chat messages 170 posted by that user 150 each time the user 150 posts a new chat message 170 in the chat session.

In an aspect of the present arrangements, the emotive model engine 144 further can determine sentiment scores assigned to chat messages 170 posted in reply to the chat messages 170 posted by each user 150-156 and derive corresponding emotive models 180. In illustration, for a particular user 150, the emotive model engine 144 can determine an average sentiment score or a weighted sum of the sentiment scores assigned to each specified sentiment from among each of the chat messages 170 posted by other users 152-156 in response to chat messages 170 posted by the user 150 in the chat session. The emotive model engine 144 can use the average sentiment score or weighted sum of the sentiment scores from the chat messages posted by the other users 152-156 as input parameters that are used to derive an emotive model 180 reflecting sentiments of the responses to the chat messages 170 posted by that user 150. The emotive model engine 144 can update or re-derive the overall emotive model 180 for the chat messages 170 posted by that user 150 each time the user 150 posts a new chat message 170 in the chat session and each time a chat message 170 is posted in response to a chat message 170 posted by the user 150.

In view of the foregoing, the various emotive models 180 derived for the chat session can express sentiments conveyed in the chat messages 170 in the chat session at various levels, including the overall sentiments expressed in the chat session, sentiments expressed in each individual chat message 170, sentiments expressed by chat messages 170 posted by each user 150-156, and sentiments expressed by other users 150-156 in chat messages 170 responding to other chat messages 170 posted by particular users 150-156. The emotive model engine 144 can assign the emotive models 180 to the chat messages 170 to which they pertain.

Each input parameter for deriving an emotive model 180 can represent a particular sentiment and a score assigned to that sentiment. For instance, for an emotive model 180 being derived for a particular chat message 170, the score for each sentiment used by the emotive model engine 144 to derive the emotive model 180 can be the score assigned to that sentiment by the chat session analyzer 142. For an emotive model 180 being derived for a plurality of chat messages 170, the score for each sentiment used by the emotive model engine 144 to derive the emotive model 180 can be an average or weighted sum of the scores assigned to that sentiment by the chat session analyzer 142.

To derive each emotive model 180, the emotive model engine 144 can apply a least squares analysis to the scores assigned to the respective sentiments. An example of a suitable least squares analysis is a non-linear least squares analysis, which sometimes may be referred to as a non-ordinary least squares analysis. Non-linear least squares is the form of least squares analysis used to fit a set of m observations into a model that is non-linear. In this regard, the emotive models 180 can be derived to implement polynomial functions. The order of the polynomial functions can be determined based on the number of specified sentiments being represented in the emotive models 180. In illustration, if there are five sentiments that are being analyzed, the polynomial functions can be quintic functions. A quintic function is a function in the following form:

$$g(x)=ax^5+bx^4+cx^3+dx^2+ex+f$$

where a, b, c, d, e and f are members of a field, typically the rational numbers, the real numbers or the complex numbers, and a is nonzero. If there are fewer sentiments specified, the polynomial functions can have a lower order. If there are more sentiments specified, the polynomial functions can have a higher order. For example, if there are three sentiments specified, the polynomial function can be a cubic function; if there are four sentiments specified, the polynomial function can be a quartic function; if there are six sentiments specified, the polynomial function can be a sextic (or hexic) function; if there are seven sentiments specified, the polynomial function can be a septic function; and so on.

The sentiment impact analyzer 146 can interface with the user interface controller 148 to present to the users 150-156 results of various sentiment analyzes described herein. Moreover, as users 150-156 compose new chat messages 170, the sentiment impact analyzer 146 can determine an impact of the new chat messages 170 on the chat session, and interface with the user interface controller 148 to present to the users 150-156 information indicating the impact prior to the users 150-156 actually posting the new chat messages 170. The user interface controller 148 can interface with the chat client applications 160-166 to present to the users 150-156 the various information in user interfaces of the chat client applications 160-166. This can serve to bring the attention of the users 150-156 to the actual words they user in the chat messages 170 and prompt the users 150-156 to consider revising the chat messages 170 before posting them.

Figure 2:
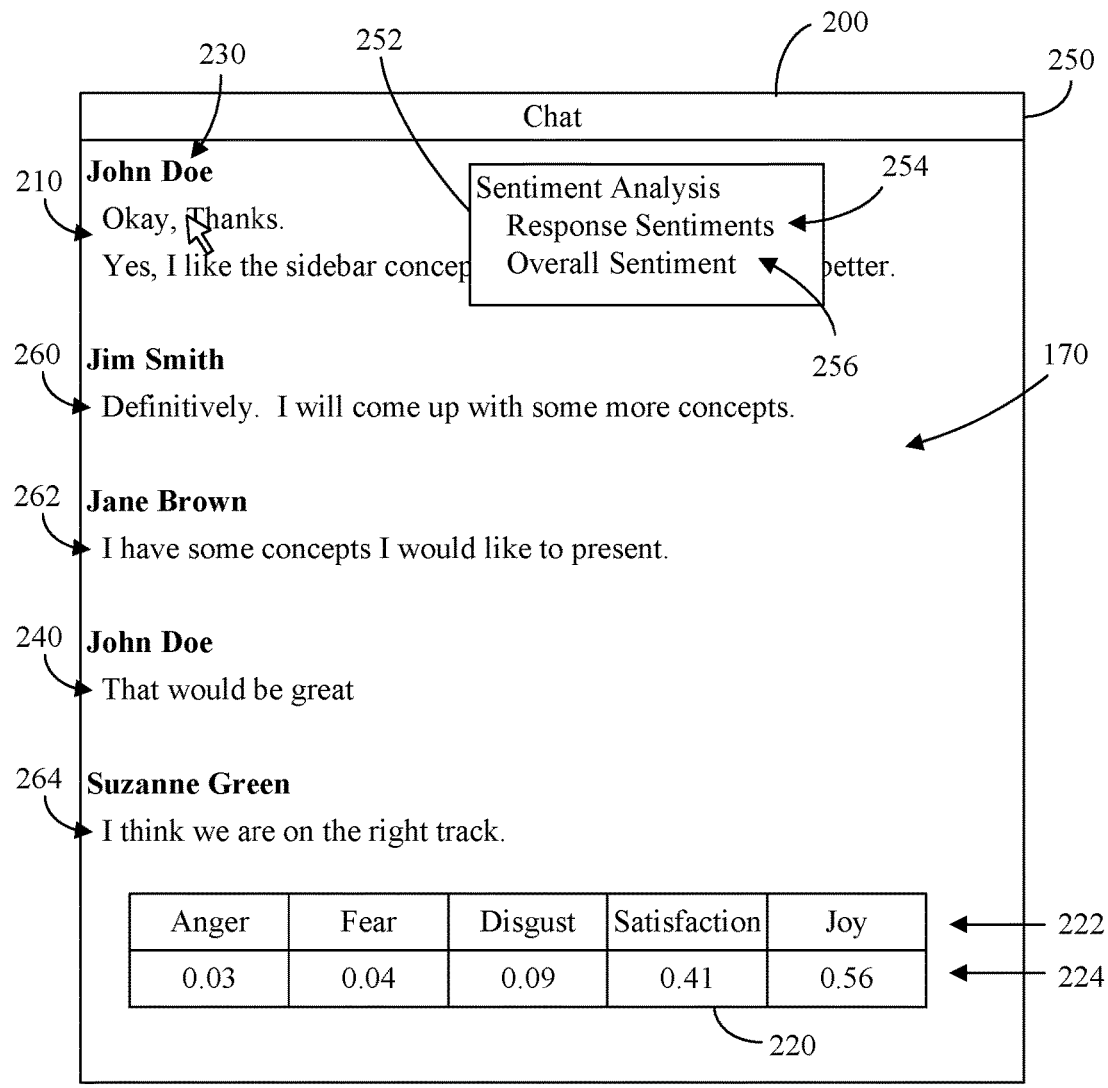
FIG. 2 depicts an example of a user interface in which chat messages exchanged in a chat session and sentiments expressed in the chat session are presented.

FIG. 2 depicts an example of a user interface 200 in which chat messages 170 exchanged in a chat session and sentiments expressed in the chat session are presented. In this example, the user interface 200 is presented to the user 150, John Doe, by the chat client application 160 of the client device 120. The user 150 can select a particular chat message 170, for example a chat message 210. In response, the sentiment impact analyzer 146 can execute the emotive model 180 assigned to that chat message 210 to generate a sentiment impact table 220 for that chat message 170 and initiate the user interface controller 148 to present the sentiment impact table 220 in the user interface 200. In this regard, the user interface controller 148 can initiate the client device 120 to present the sentiment impact table 220 by communicating to the chat client application 160 the sentiment impact table 220. The sentiment impact table 220 can indicate each specified sentiment 222 and, for each sentiment 222, a corresponding score 224 assigned to that sentiment 222. It should be noted that the sentiment impact table 220 need not indicate names of participants in the chat session, places, etc. Further, the sentiment impact table 220 need not indicate personality types, history of interactions, etc.

The user 150 also can select his user identifier 230. In response, the sentiment impact analyzer 146 can execute the emotive model 180 assigned to the chat messages 210, 240 posted by the user 150 to generate a sentiment impact table for the chat messages 210, 240 and initiate the user interface controller 148 to present that sentiment impact table in the user interface 200. In illustration, the user interface controller 148 can replace the sentiment impact table 220 with the new sentiment impact table, present the new sentiment impact table in a different location in the user interface 200, or update the sentiment impact table 220 with new scores 224 determined by the emotive model 180.

Further, the user 150 can select the chat session, for example by selecting a field or control 250 in the user interface for the chat session. In response, the chat client application 160 (e.g., at the behest of the user interface controller 148) can present a menu 252. From the menu 252 the user 150 can select a menu item 254 assigned to the response sentiments of other users 152-156 toward the chat messages 210, 240 posted by the user 150. In response to the user 150 selecting the menu item 254, the sentiment impact analyzer 146 can execute the emotive model 180 assigned to chat messages 260, 262, 264 generated by other users 152-156 in response to chat messages 210, 240 generated by the user 150. Based on that emotive model 180, the sentiment impact analyzer 146 can generate a sentiment impact table for the chat messages 260, 262, 264 and initiate the user interface controller 148 to present that sentiment impact table in the user interface 200. In illustration, the user interface controller 148 can replace the sentiment impact table 220 with the new sentiment impact table, present the new sentiment impact table in a different location in the user interface 200, or update the sentiment impact table 220 with new scores 224 determined by the emotive model 180.

Further, the user 150 can select from the menu 252 a menu item 256 assigned to the overall sentiment of the chat session. In response, the sentiment impact analyzer 146 can execute the emotive model 180 assigned to the overall chat session (e.g., assigned to the group of chat messages 170, including the chat messages 210, 240 and 260-264) to generate a sentiment impact table for the overall chat session and initiate the user interface controller 148 to present that sentiment impact table in the user interface 200. In illustration, the user interface controller 148 can replace the sentiment impact table 220 with the new sentiment impact table, present the new sentiment impact table in a different location in the user interface 200, or update the sentiment impact table 220 with new scores 224 determined by the emotive model 180.

Figure 3:
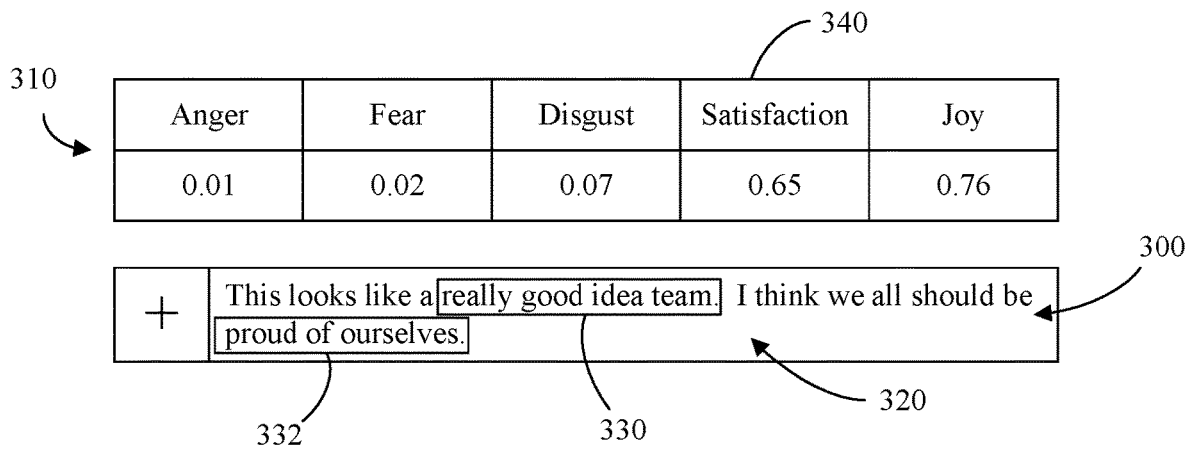
FIG. 3 depicts an example of a composed chat message and sentiments expressed in the chat message.

FIG. 3 depicts an example of a composed chat message 300 and sentiments 310 expressed in the chat message 300. In this example, assume that the user 150 is composing the new chat message 300 for the chat session using the user interface 200 of FIG. 2. While the user composes the chat message 300, the user interface controller 148 can communicate with the chat client application 160 to monitor, in real time, the text 320 being composed by the user 150 in the chat message 300. The user interface controller 148 can communicate, in real time, the text 320 to the chat session sentiment analyzer 142. The chat session sentiment analyzer 142 can perform NLP, semantic analysis and computational linguistics on the text 320 to analyze sentiments expressed and/or implied by the chat message 300, and generate corresponding sentiment scores for the chat message 300. Further, the chat session sentiment analyzer 142 can identify one or more terms 330, 332 contained in the text 320 that have a highest level of impact on the sentiment scores.

Based on the sentiment scores of the chat message 300, as well as the determined overall sentiment of the chat session previously described, the emotive model engine 144, in real time, can generate an emotive model 180 for the chat message 300. In illustration, input parameters used by the emotive model engine 144 to derive the emotive model 180 can include an average sentiment score or a weighted sum of the sentiment scores assigned to each specified sentiment from among each of the previously posted chat messages 170 and the new chat message 300. The sentiment impact analyzer 146 can execute the emotive model 180 for the chat message 300 to generate a sentiment impact table 340 for that chat message 300 and initiate the user interface controller 148 to present the sentiment impact table 340 in the user interface. In this regard, the user interface controller 148 can initiate the client device 120 to present the sentiment impact table 340 by communicating to the chat client application 160 the sentiment impact table 340. The sentiment impact table 340 can indicate an impact on the sentiment of the chat session by the new chat message 300.

Further, the sentiment impact analyzer 146 can indicate, in the chat message 300, the terms 330, 332 contained in the text 320 that have a highest level of impact on the sentiment scores. For example, the sentiment impact analyzer 146 can initiate the user interface controller 148 to initiate the chat client application 160 to highlight the terms 330, 332 in the chat message. In another arrangement, the terms 330, 332 can be highlighted as the user hovers a cursor over the text 320 or hovers the cursor over those terms 330, 332. Accordingly, as the user 150 composes the text 320 of the chat message 300, the user 150 can evaluate the scores indicated in the sentiment impact table 340 and give consideration to terms the user 150 is entering in the chat message 300. As the 150 adds additional text 320 and/or changes text 320 in the chat message 300, the above described analyses can be updated in real time to update the emotive model 180 and update the sentiment impact table 340. Accordingly, the user 150 can update/revise the chat message 300 to convey the emotional impact desired by the user 150.

Figure 4:
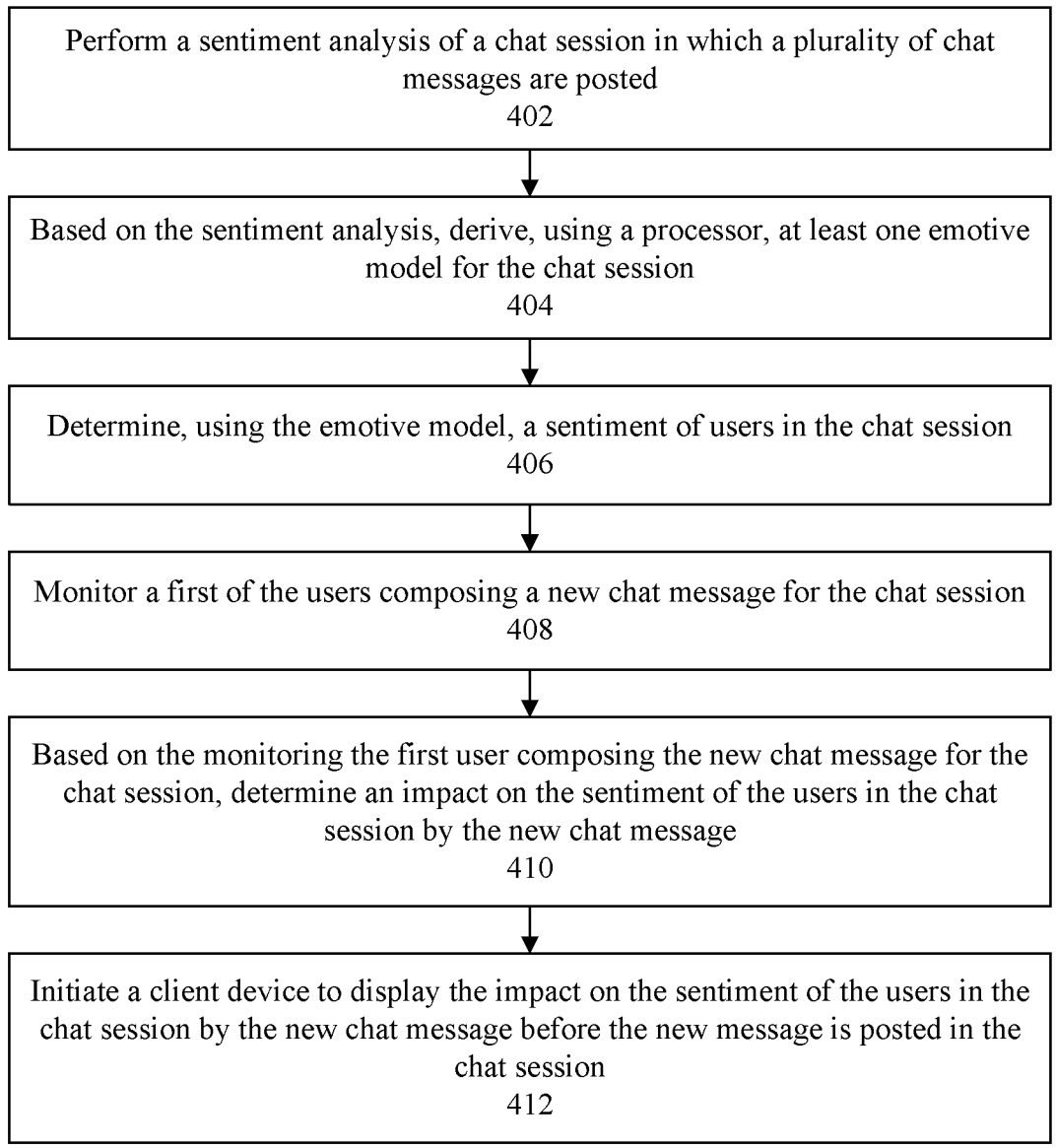
FIG. 4 is a flowchart illustrating an example of a method of indicating a predicted impact of a new chat message on sentiment of users participating in a chat session.

FIG. 4 is a flowchart illustrating an example of a method 400 of indicating a predicted impact of a new chat message on sentiment of users participating in a chat session. The method 400 can be implemented by the social collaboration system 110 of FIG. 1. At step 402, the social collaboration system 110 can perform a sentiment analysis of a chat session in which a plurality of chat messages are posted. At step 404, the social collaboration system 110 can, based on the sentiment analysis, derive, using a processor, at least one emotive model for the chat session. At step 406, the social collaboration system 110 can determine, using the emotive model, a sentiment of users in the chat session. At step 408, the social collaboration system 110 can monitor a first of the users composing a new chat message for the chat session. At step 410, the social collaboration system 110 can, based on the monitoring the first user composing the new chat message for the chat session, determine an impact on the sentiment of the users in the chat session by the new chat message. At step 412, the social collaboration system 110 can initiate a client device to display the impact on the sentiment of the users in the chat session by the new chat message before the new message is posted in the chat session.

Using at least one emotive model, the social collaboration system 110 also can initiate the client device to display the overall sentiments of the plurality of users in the chat session, initiate the client device to display the sentiment of at least a second user in the chat session toward at least one chat message posted by the first user, initiate the client device to display the sentiment of a previous chat message posted in the chat session by the first user and/or initiate the client device to display the sentiment of a plurality of previous chat messages posted in the chat session by the first user.

Figure 5:
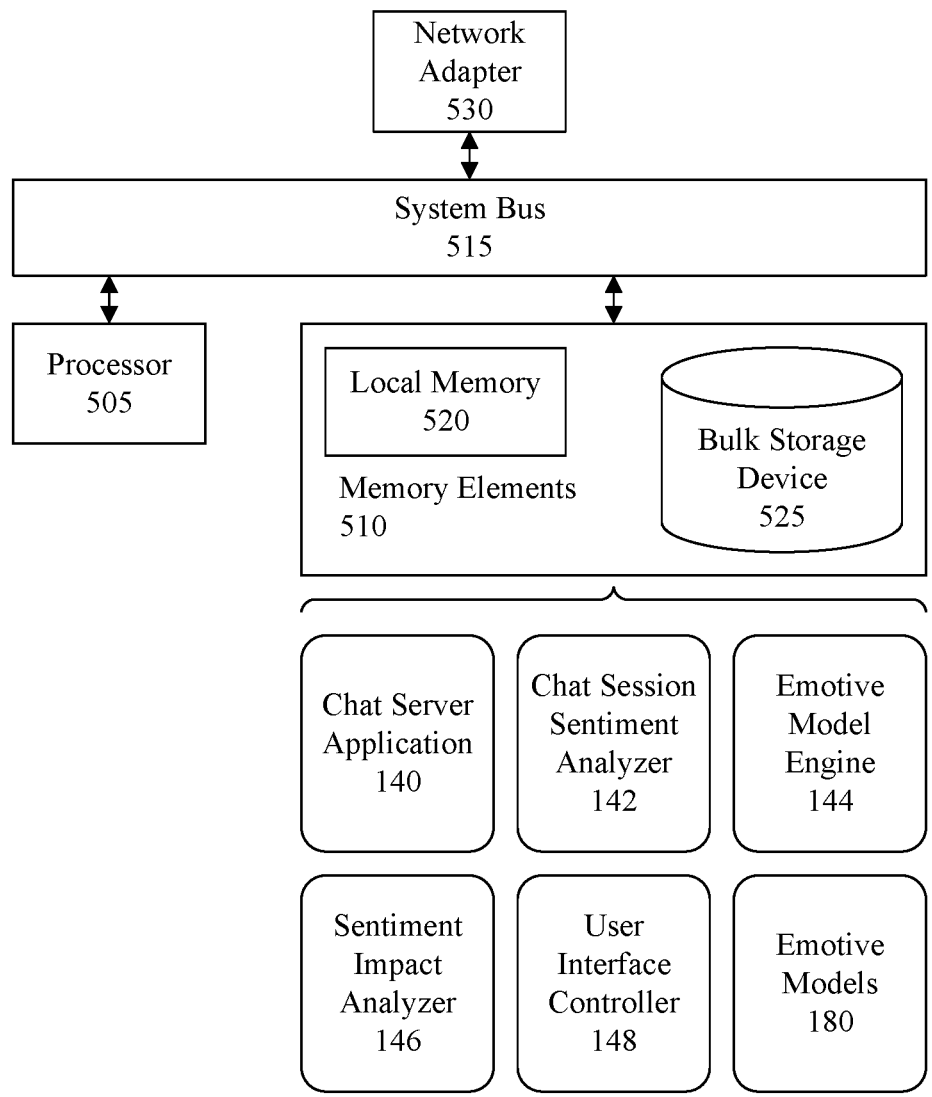
FIG. 5 is a block diagram illustrating example architecture for a data processing system.

FIG. 5 is a block diagram illustrating example architecture for a social collaboration system 110. The social collaboration system 110 can include at least one processor 505 (e.g., a central processing unit) coupled to memory elements 510 through a system bus 515 or other suitable circuitry. As such, the social collaboration system 110 can store program code within the memory elements 510. The processor 505 can execute the program code accessed from the memory elements 510 via the system bus 515. It should be appreciated that the social collaboration system 110 can be implemented in the form of any system including a processor and memory that is capable of performing the functions and/or operations described within this specification. For example, the social collaboration system 110 can be implemented as a server, a plurality of communicatively linked servers, a workstation, a desktop computer, a mobile computer, and so on.

The memory elements 510 can include one or more physical memory devices such as, for example, local memory 520 and one or more bulk storage devices 525. Local memory 520 refers to random access memory (RAM) or other non-persistent memory device(s) generally used during actual execution of the program code. The bulk storage device(s) 525 can be implemented as a hard disk drive (HDD), solid state drive (SSD), or other persistent data storage device. The social collaboration system 110 also can include one or more cache memories (not shown) that provide temporary storage of at least some program code in order to reduce the number of times program code must be retrieved from the bulk storage device 525 during execution.

One or more network adapters 530 also can be coupled to social collaboration system 110 to enable the social collaboration system 110 to become coupled to other systems, computer systems, remote printers, and/or remote storage devices through intervening private or public networks. Modems, cable modems, transceivers, and Ethernet cards are examples of different types of network adapters 530 that can be used with the social collaboration system 110.

As pictured in FIG. 5, the memory elements 510 can store the components of the social collaboration system 110, namely the chat server application 140, the chat session sentiment analyzer 142, the emotive model engine 144, the sentiment impact analyzer 146 the user interface controller 148, and the emotive models 180. Being implemented in the form of executable program code, these components 140-148. 180 of the social collaboration system 110 can be executed by the social collaboration system 110 and, as such, can be considered part of the social collaboration system 110. Moreover, the components 140-148. 180 are functional data structures that impart functionality when employed as part of the social collaboration system 110.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    performing a sentiment analysis of a chat session in which a plurality of chat messages are posted;
    based on the sentiment analysis, deriving, using a processor, a respective emotive model for each of the plurality of chat messages in the chat session and, based on the respective emotive models, deriving an overall emotive model for the chat session;
    determining, using the overall emotive model, a sentiment of users in the chat session;
    monitoring a first of the users composing a new chat message for the chat session;
    based on the monitoring the first user composing the new chat message for the chat session and based on the overall emotive model for the chat session, prior to the new chat message being posted in the chat session, determining an impact on the sentiment of the users in the chat session by the new chat message; and
    prior to the new chat message being posted in the chat session, initiating a client device to display to the first user a sentiment impact table indicating the impact on the sentiment of the users in the chat session by the new chat message before the new chat message is posted in the chat session.

2. The method of claim 1, wherein the overall emotive model implements a polynomial function.

3. The method of claim 2, wherein the polynomial function is a quintic function.

4. The method of claim 1, wherein the overall emotive model for the chat session comprises an emotive model that expresses overall sentiments of the users in the chat session.

5. The method of claim 4, further comprising:
    initiating the client device to display the overall sentiments, using the overall emotive model, of the users in the chat session.

6. The method of claim 1, wherein at least one of the respective emotive models for the chat session comprises an emotive model that expresses sentiment of at least a second user in the chat session toward at least one chat message posted by the first user in the chat session.

7. The method of claim 6, further comprising:
    initiating the client device to display the sentiment, using the at least one of the respective emotive models, of at least the second user in the chat session toward the at least one chat message posted by the first user in the chat session.

8. The method of claim 1, wherein at least one of the respective emotive models for the chat session comprises an emotive model that expresses sentiment of previous chat messages posted in the chat session by the first user.

9. The method of claim 8, further comprising:
    initiating the client device to display the sentiment, using the respective emotive models, of previous chat messages posted in the chat session by the first user.

10. A system, comprising:
    a processor programmed to initiate executable operations comprising:
    performing a sentiment analysis of a chat session in which a plurality of chat messages are posted;
    based on the sentiment analysis, deriving a respective emotive model for each of the plurality of chat messages in the chat session and, based on the respective emotive models, deriving an overall emotive model for the chat session;
    determining, using the overall emotive model, a sentiment of users in the chat session;
    monitoring a first of the users composing a new chat message for the chat session;
    based on the monitoring the first user composing the new chat message for the chat session and based on the overall emotive model for the chat session, prior to the new chat message being posted in the chat session, determining an impact on the sentiment of the users in the chat session by the new chat message; and prior to the new chat message being posted in the chat session, initiating a client device to display to the first user a sentiment impact table indicating the impact on the sentiment of the users in the chat session by the new chat message before the new chat message is posted in the chat session.

11. The system of claim 10, wherein the overall emotive model implements a polynomial function.

12. The system of claim 11, wherein the polynomial function is a quintic function.

13. The system of claim 10, wherein the overall emotive model for the chat session comprises an emotive model that expresses overall sentiments of the users in the chat session.

14. The system of claim 13, the executable operations further comprising:

initiating the client device to display the overall sentiments, using the overall emotive model, of the users in the chat session.

15. The system of claim 10, wherein at least one of the respective emotive models for the chat session comprises an emotive model that expresses sentiment of at least a second user in the chat session toward at least one chat message posted by the first user in the chat session.

16. The system of claim 15, the executable operations further comprising:

initiating the client device to display the sentiment, using the at least one of the respective emotive models, of at least the second user in the chat session toward the at least one chat message posted by the first user in the chat session.

17. The system of claim 10, wherein at least one of the respective emotive models for the chat session comprises an emotive model that expresses sentiment of previous chat messages posted in the chat session by the first user.

18. The system of claim 17, the executable operations further comprising:

initiating the client device to display the sentiment, using the respective emotive models, of previous chat messages posted in the chat session by the first user.

19. A computer program product, comprising:

a computer readable storage medium having program code stored thereon, the program code executable by a data processing system to initiate operations including:

performing a sentiment analysis of a chat session in which a plurality of chat messages are posted;

based on the sentiment analysis, deriving a respective emotive model for each of the plurality of chat messages in the chat session and, based on the respective emotive models, deriving an overall emotive model for the chat session;

determining, using the overall emotive model, a sentiment of users in the chat session;

monitoring a first of the users composing a new chat message for the chat session;

based on the monitoring the first user composing the new chat message for the chat session and based on the overall emotive model for the chat session, prior to the new chat message being posted in the chat session, determining an impact on the sentiment of the users in the chat session by the new chat message; and prior to the new chat message being posted in the chat session, initiating a client device to display to the first user a sentiment impact table indicating the impact on the sentiment of the users in the chat session by the new chat message before the new chat message is posted in the chat session.

20. The computer program product of claim 19, wherein the overall emotive model implements a polynomial function.

* * * * *